United States Patent [19]

Oh

[11] Patent Number: 5,110,243
[45] Date of Patent: May 5, 1992

[54] APPARATUS FOR ATTACHING OBJECTS TO A PANEL

[76] Inventor: Jung H. Oh, 91-265, Shinsu-dong, Mapo-ku, Seoul, Rep. of Korea

[21] Appl. No.: 555,243

[22] Filed: Jul. 19, 1990

Related U.S. Application Data

[63] Continuation-in-part of Ser. No. 160,304, Feb. 25, 1988, Pat. No. 5,044,854.

[51] Int. Cl.⁵ .............................................. F16B 37/08
[52] U.S. Cl. ..................................... 411/344; 411/432; 411/999
[58] Field of Search .............. 411/340, 344, 345, 346, 411/432, 433, 540, 973, 999

[56] References Cited

U.S. PATENT DOCUMENTS

| | | | |
|---|---|---|---|
| 1,003,527 | 9/1911 | Smith | 411/340 |
| 1,516,242 | 11/1924 | Peirce | 411/346 |
| 1,521,024 | 12/1924 | Hubener | 411/344 |
| 1,521,025 | 12/1924 | Hubener | 411/344 |
| 2,301,135 | 11/1942 | Molat | 411/345 |
| 3,211,042 | 10/1965 | Fischer | 411/344 |
| 3,244,056 | 4/1966 | Kern | 411/340 |
| 4,883,398 | 11/1989 | Duncan | 411/344 |
| 5,007,223 | 4/1991 | Holland | 411/344 |

Primary Examiner—P. W. Echols
Assistant Examiner—David P. Bryant
Attorney, Agent, or Firm—Donald C. Feix

[57] ABSTRACT

A fastening device and method for securely attaching objects, which objects can be relatively large in size, to a front side of a panel having the other side closed or hidden, which panel can be relatively thin in thickness, uses an elongated auxiliary member which is insertable lengthwise through an insertion hole formed in the panel. The auxiliary member is positionable on the back side of the panel to extend along a significant linear distance on the back side of the panel. The object is attached to the panel and the auxiliary member by a plurality of fasteners. Each fastener extends through aligned openings formed in the object, the panel, and the auxiliary member. Each of the set of aligned openings is separate and spaced from the insertion hole to thereby provide a plurality of attachment forces. Each attachment force is separate and spaced from the location of the insertion hole. Relatively large and/or heavy objects can be securely attached to a panel which can be relatively thin in thickness by a plurality of points of attachment which are separate and spaced from the insertion hole.

4 Claims, 3 Drawing Sheets

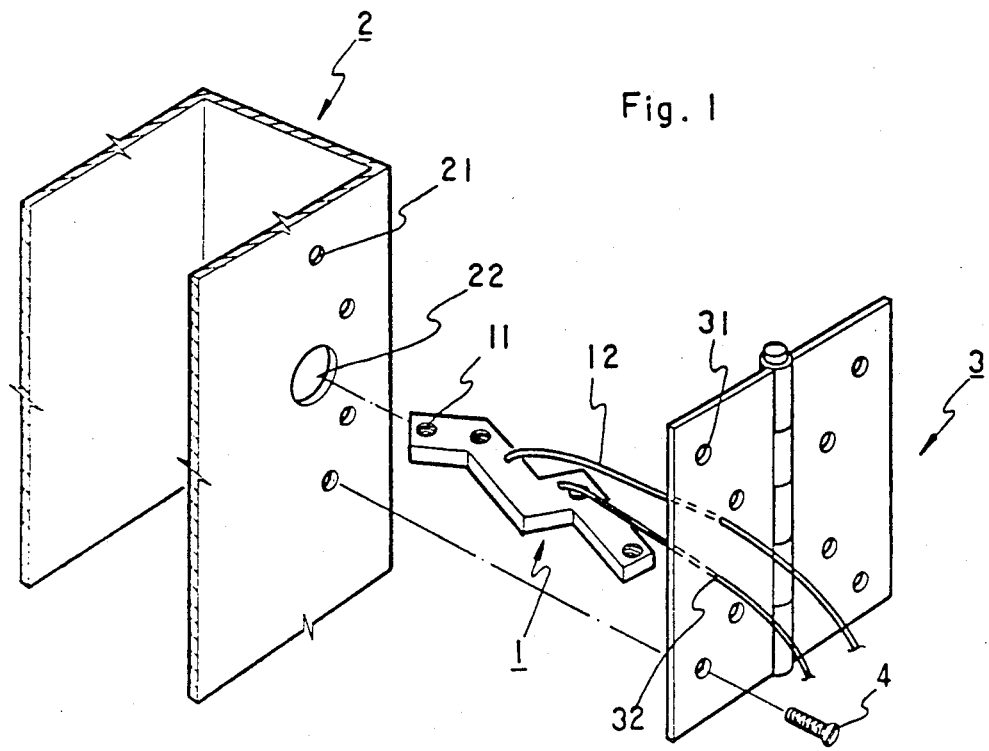
Fig. 1
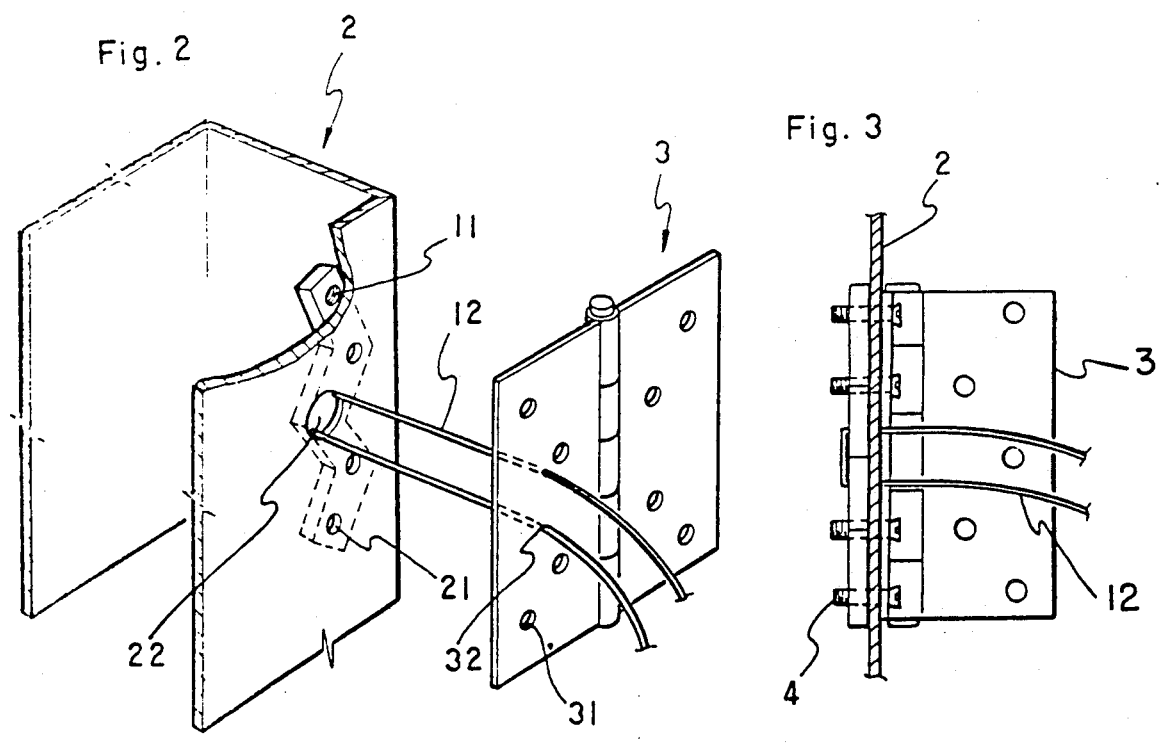
Fig. 2
Fig. 3

Fig. 4a
Fig. 4b
Fig. 4c
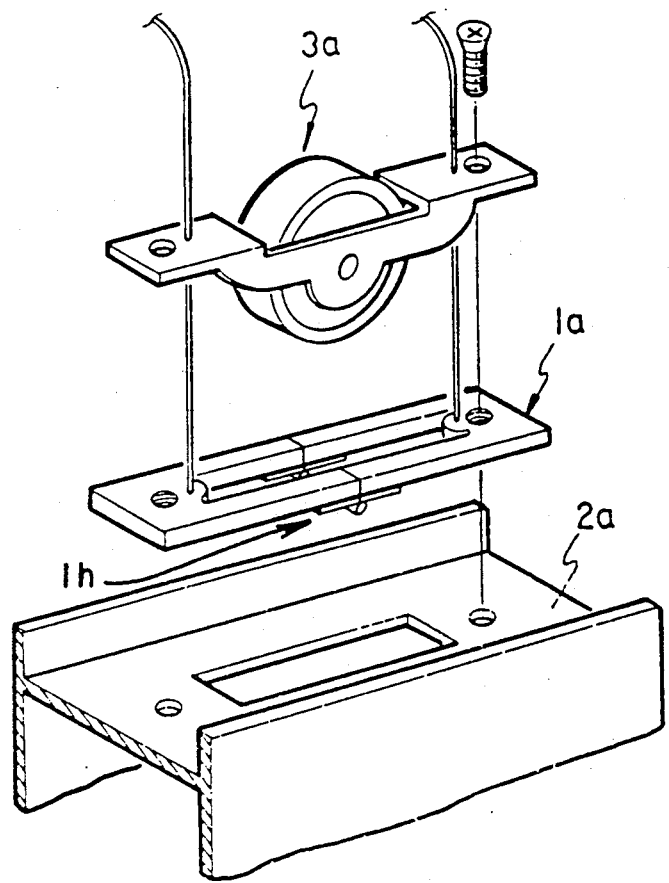
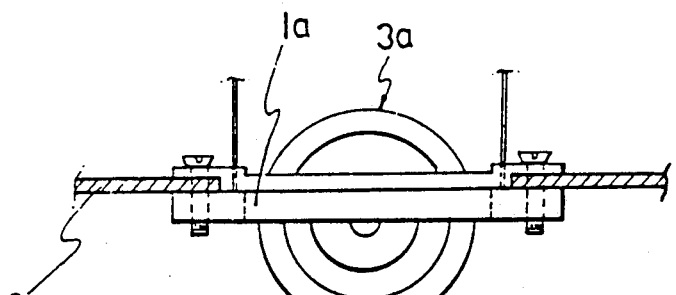
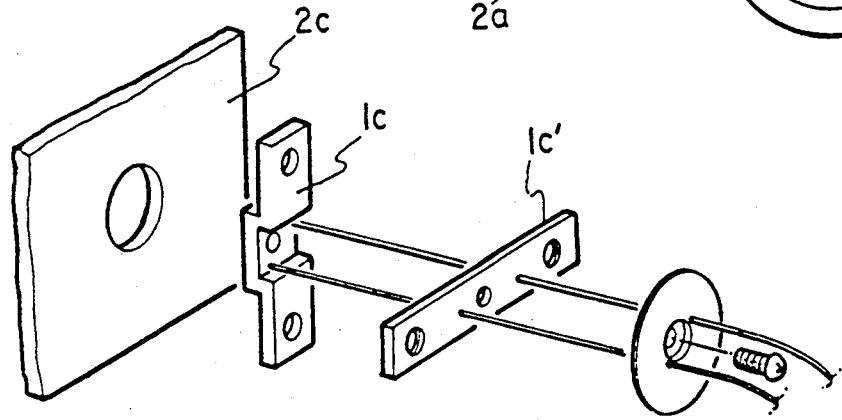

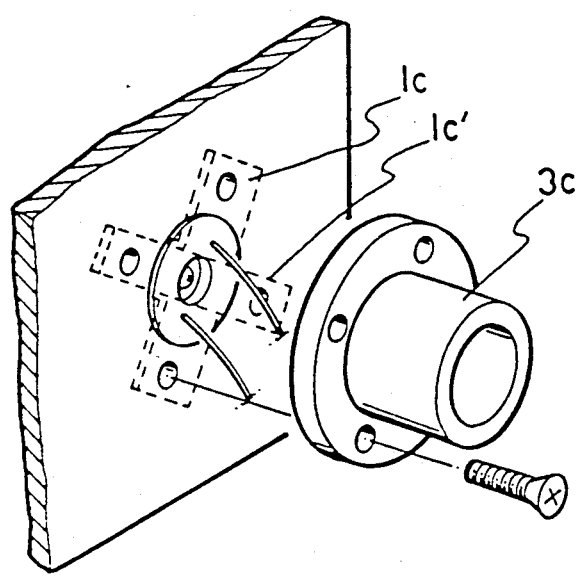
Fig. 4d
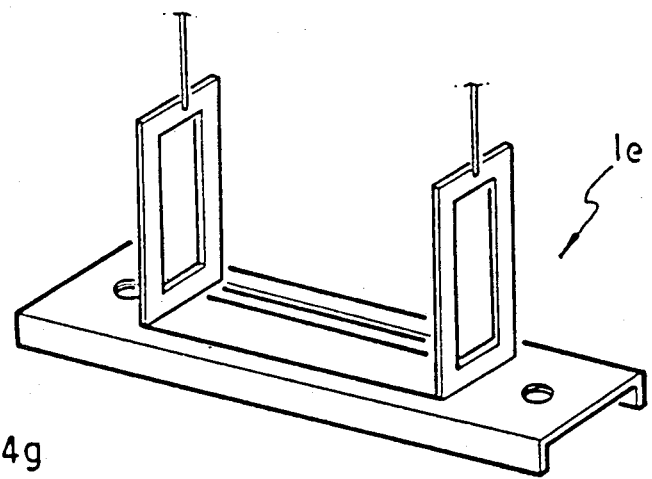
Fig. 4e
Fig. 4f
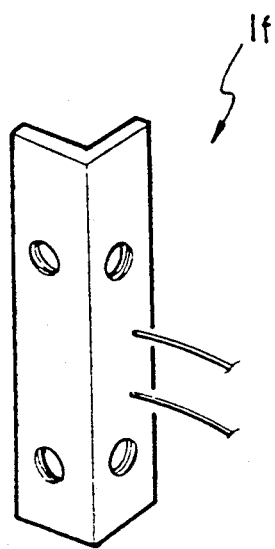
Fig. 4g
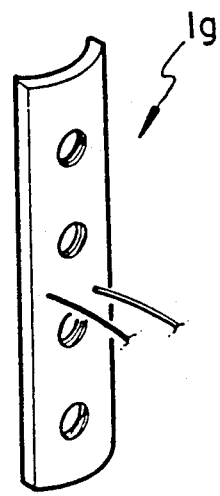

APPARATUS FOR ATTACHING OBJECTS TO A PANEL

RELATED APPLICATION

This application is a continuation-in-part of parent U.S. patent application Ser. No. 5,044,854 issued Sep. 3, 1991.

FIELD OF THE INVENTION

The present invention relates to a method for attaching an object to a panel type structure and an aiding device thereof, by which such an attachment can be easily and reliably carried out even in the case where the other side of the structure is not approachable, and at the same time, the panel member of the fastening portion of said structure is too thin to secure the fastening strength or too thick to allow a tapping through the thick wall, assuming that an object is attached by means of a screw, a bolt or a riveting to a panel type structure such as a vehicle body, a wall, a sealed tank and the like.

BACKGROUND OF THE INVENTION

Generally, in the case where an object such as a hinge, a sliding wheel, a bracket, a flanged sleeve and the like is to be attached to the external side of a panel type structure, a hole is drilled at the fastening portion of the panel member or wall in order to insert a screw, a bolt or a blind rivet, and then, the object to be attached is fastened using the above mentioned means. However, in the case where the panel member of the fastening portion is too thin to accommodate a number of screw pitches large enough to provide a proper fastening strength, an additional reinforcing plate has to be put to the other side of the structure where an object is to be attached. In this case the additional reinforcing plate should be thick enough to provide a proper withstanding strength, and a threaded fastening hole or a riveting hole has to be formed on the additional reinforcing plate.

Further, in the case where a structure is too thick to allow a tapping through the structure as in the case of a wall, and in the case where the hardness of the structure is too high to allow a tapping operation, the above mentioned kind of an additional aiding plate is required.

However, there is the problem that, if the other side (or inner side) of the structure is in a closed state, or has a limited space to such extent that the other side is not approachable by means of a hand or a tool, then the above mentioned additional reinforcing plate or aiding plate cannot be installed, as well as other kinds of fastening means.

In an effort to overcome such problems, there have been proposed a plurality of devices using divided washers, nuts and guide strings. For example, a fastening hole having a diameter large enough to receive a nut is provided, and a washer having an outside diameter larger than the inner diameter of the fastening hole is divided into several pieces. Then the nut and the divided pieces of the washer are connected by means of a guide string, and then, they are inserted through the fastening hole. The nut and the divided pieces of the washer are constituted such that if the guide string is pulled forward, they are assembled into the complete original form at the other side of the structure. Thus the nut and the washer are secured at the other side of the structure so that an object to be attached could be fastened by means of a fastening aid such as a bolt and the like.

Another device is constituted such that a relatively large insertion hole is drilled through the structure, and a divided washer having an outside diameter larger than the diameter of the insertion hole is inserted into the insertion hole. The divided washer is provided with a plurality of fastening holes on a region coming within the boundary of the insertion hole.

This device is useful for the case where the object to be attached requires a plurality of fastening holes.

However, if the fastening holes of the object to be attached are too widely dispersed to such extent that the fastening holes of the object are located too outwardly from the boundary of the insertion hole, then the device is of no use.

Therefore, if a plurality of insertion holes on the structure are to be used for fastening the object, it is necessary that a plurality of separate divided washers have to be provided at the other side of the structure at positions corresponding to a plurality of the insertion holes. However, in the case where it is required that the insertion holes are to be adjacently located one another, there is the possibility that the divided washers can be overlapped partially, and that the attachment of the object is not strong enough due to the narrowed area of the array of the fastening holes.

SUMMARY OF THE INVENTION

The present invention is intended to overcome the above described disadvantages of the prior art.

Therefore it is the object of the present invention to provide a method for attaching an object to a panel type structure and an aiding device thereof, in which a single insertion hole is drilled, and the fastenings for the dispersed fastening holes of the object are carried out by utilizing the single insertion hole.

According to the method of the present invention, even in the case where the structure is too thin to withstand against an attachment of an object, objects such as hinges, sliding wheels, etc. can be attached easily and reliably by fastening means such as bolts.

Especially in the case where attachment of an object requires a plurality of dispersed fastening holes, a relatively narrow and linear type aiding plate is used, this plate being for inserting through the insertion hole, and having a plurality of fastening holes at the positions corresponding to the jointing holes of the object. Further, in the rare case where the fastening holes of the object are too widely dispersed, two or more insertion holes are drilled through the structure, thereby making it possible to attach the object to the structure very firmly.

The aiding plate, or auxiliary member, according to the present invention should be preferably narrow in its linear width and long in its total length. Further, the plate has to cover all the dispersed fastening holes of the object, by means of taking the shapes of "M, N, L, T, S, C, X, U, V, W, ☐ . . . and 2" and any other linear shape. In any case, the width of the aiding plate should be smaller than the diameter of the insertion hole.

BRIEF DESCRIPTION OF THE DRAWINGS

The above objects and other advantages of the present invention will become more apparent by describing in detail the preferred embodiments of the present invention with reference to the attached drawings in which, FIG. 1 through 3 illustrates each processing state of attaching a conventional hinge to the structure using the typical aiding plate of W-type:

FIG. 1 illustrates a state before the aiding plate of the present invention is inserted through the insertion hole;

FIG. 2 illustrates a state after the aiding plate of the present invention is inserted through the insertion hole;

FIG. 3 illustrates a state in which a hinge is attached by means of the aiding plate according to the present invention; and FIG. 4 illustrates other embodiments of the present invention in which:

FIGS. 4a and 4b illustrate a second embodiment of present invention;

FIGS. 4c and 4d illustrate a third embodiment of the present invention;

FIG. 4e illustrates a fourth embodiment of the present invention;

FIG. 4f illustrates a fifth embodiment of the present invention; and

FIG. 4g illustrates a sixth embodiment of the present invention.

DESCRIPTION OF THE PREFERRED EMBODIMENTS

FIGS. 1 to 3 illustrate the process of attaching an ordinary hinge 3 to an exemplary panel type structure 2 by means of a W-shaped aiding plate 1 which is the typical embodiment of the present invention. The W-shaped aiding plate 1 is provided with a plurality of fastening holes 11 at the positions corresponding to jointing holes 31 of the object to be attached, while, in other embodiments of the aiding plate, the positions and the number of the fastening holes 11 will become different depending on the type of the object to be attached. Further, the fastening holes of the aiding plate shown in FIGS. 1 to 3 are provided with threads for fastening with screws 4, but in the case where a blind riveting (not shown) is used, the fastening holes of the aiding plate are not provided with threads.

Meanwhile, in the embodiment of the FIGS. 1 to 3, the hinge 3 is provided with a pair of guide holes 32 so that a guide string 12 can pass through the guide holes 32, and also pass through a pair of holes formed at the middle positions of the aiding plate 1. Passing holes 21 are formed through the panel type structure 2 at the positions corresponding to the jointing holes 31 of the hinge 3, while an insertion hole 22 is drilled through the panel type structure 2 in order to insert the aiding plate 1 through it.

Thus, if the aiding plate 1 is inserted through the insertion hole 22, and if the guide string 12 is pulled forward, then the aiding plate 2 is tentatively secured at the other side of the panel type structure 2 as shown in FIG. 2. Then, the respective sets of the holes 11,21,31 are aligned together in that order, and then, the screws 4 are respectively inserted into the sets of the aligned holes to threadably fasten them to the threaded fastening holes 11, thereby attaching the hinge 3 to the panel type structure 2 easily and reliably.

The insertion hole drilled through the structure is for inserting the aiding plate, and therefore, the insertion hole can take the shape of a circle (as in FIG. 1), a rectangle, a polygon, or any other shape.

Further, the aiding plate can take the shape of "M, N, "L, T, S, C, X, U, V, W, 2☐. . ." and any other shape, as long as it is an elongated linear shape so it can be inserted through the insertion hole, and as long as it covers all the joining or fastening holes of the object to be attached. However, the width of the aiding plate should be always smaller than the diameter of the insertion hole formed through the structure.

Further, the aiding plate according to the present invention can be divided in the direction of the length, and the divided pieces can be joined by means of springs or hinges see for example 1h on the aiding plate 1a of FIG. 4a. Such a divided aiding plate can be used for the case where the other side of the panel structure has a small space. Upon being inserted through the insertion hole, this aiding plate is accommodated within the narrow space in a folded or deflected state. Then, by pulling the guide string, the aiding plate can be unfolded to the original state.

Further, the aiding plate of the present invention can be made of various materials such as ferrous alloy, non-ferrous alloy, synthetic resin, wood and the like, the preference of the material becoming different depending on the material of the structure, depending on the kind of object to be attached, and depending on the fastening strength required.

FIGS. 4a to 4g illustrate other embodiments according to the present invention, and these will be briefly described below.

FIGS. 4a and 4b illustrate a case in which a sliding wheel 3a is attached to a panel type structure 2a by means of an aiding plate 1a which is the second embodiment of the present invention. FIGS. 4c and 4d illustrate a case in which a flanged sleeve 3c is attached to a plane structure 2c by means of aiding plates 1c, 1c' which are the third embodiment of the present invention. FIGS. 4e,4f,4g illustrate aiding plates 1e,1f,1g which are respectively the fourth, fifth and sixth embodiments of the present invention.

According to the method of the present invention in which an aiding plate is used to attach an object to a panel type structure, the object is attached by means of an aiding plate which reinforces the attachment at the other side of the panel member of the structure, and therefore, even in the case where the panel member is extremely thin, a firm attaching strength can be maintained.

What is claimed is:

1. A fastening device for securely attaching objects, which objects can be large in size, to a front side of a panel having the other side not approachable or hidden, which panel can be thin in thickness, by the use of an auxiliary member, which auxiliary member has an elongate form so as to be insertable lengthwise through an insertion hole in the panel and which auxiliary member is positionable on the back side of the panel to extend along a linear distance on said back side of the panel, and by the use of plurality of fasteners, each of which fasteners extends through aligned openings formed in the object, the panel and the auxiliary member and each of which openings is separate and spaced from the insertion hole to thereby provide a plurality of attachment forces, each of which forces is separate and spaced from the location of the insertion hole, and wherein the object has a rear surface directly engagable with a front surface of the panel and wherein the object itself can be large and/or heavy or the object can be a device such as a hinge which supports a large and/or heavy part such as a door, said fastening device comprising, an auxiliary member having an elongate form so as to be insertable lengthwise through an insertion hole in the panel, said auxiliary member having a surface complementary to and engagable with the back surface of the panel, said auxiliary member being sufficiently elongated in form to extend along a linear distance on said back side of the panel and being constructed to permit a plurality of fastening holes to be formed through the auxiliary member at locations spaced away from the insertion hole, fastening holes formed in the auxiliary member and the object and alignable with respective fastening holes formed in the panel, guide string means connected to the auxiliary member for pulling the auxiliary member forward after the auxiliary member has been inserted through the insertion hole to hold the front surface of the auxiliary member in place against the back surface of the panel member with the fastening holes of the auxiliary member in alignment with the fastening holes in the panel, fastener means insertable in the aligned fastening holes in the object, panel and auxiliary member for securely attaching the object to the panel when the fastener means are fastened to the auxiliary member, and wherein each of said fastening holes is separate and spaced from the insertion hole so that the fastener means provide a plurality of attachment forces each of which is separate and spaced from the location of the insertion hole, and whereby large and/or heavy objects can be securely attached to a panel which can be thin in thickness by a plurality of points of attachment which are separate and spaced from the insertion hole, and wherein said auxiliary member is provided with a pair of holes for a guide string, has a W-shape, as viewed in plan, and has a plurality of fastening holes provided with inner threads.

2. A fastening device for securely attaching objects, which objects can be large in size, to a front side of a panel having the other side not approachable or hidden, which panel can be thin in thickness, by the use of an auxiliary member, which auxiliary member has an elongate form so as to be insertable lengthwise through an insertion hole in the panel and which auxiliary member is positionable on the back side of the panel to extend along a linear distance on said back side of the panel, and by the use of a plurality of fasteners, each of which fasteners extends through aligned openings formed in the object, the panel and the auxiliary member and each of which openings is separate and spaced from the insertion hole to thereby provide a plurality of attachment forces, each of which forces is separate and spaced from the location of the insertion hole, and wherein the object has a rear surface directly engagable with a front surface of the panel and wherein the object itself can be large and/or heavy or the object can be a device such as a hinge which supports a large and/or heavy part such as a door, said fastening device comprising, an auxiliary member having an elongate form so as to be insertable lengthwise through an insertion hole in the panel, said auxiliary member having a surface complementary to and engagable with the back surface of the panel, said auxiliary member being sufficiently elongated in form to extend along a linear distance on said back side of the panel and being constructed to permit a plurality of fastening holes to be formed through the auxiliary member at locations spaced away from the insertion hole, fastening holes formed in the auxiliary member and the object and alignable with respective fastening holes formed in the panel, guide string means connected to the auxiliary member for pulling the auxiliary member forward after the auxiliary member has been inserted through the insertion hole to hold the front surface of the auxiliary member in place against the back surface of the panel member with the fastening holes of the auxiliary member in alignment with the fastening holes in the panel, fastener means insertable in the aligned fastening holes in the object, panel and auxiliary member for securely attaching the object to the panel when the fastening means are fastened to the auxiliary member, and wherein each of said fastening holes is separate and spaced from the insertion hole so that the fastener means provide a plurality of attachment forces each of which is separate and spaced from the location of the insertion hole, and whereby large and/or heavy objects can be securely attached to a panel which can be thin in thickness by a plurality of points of attachment which are separate and spaced from the insertion hole.

3. A fastening device for securely attaching objects, which objects can be large in size, to a front side of a panel having the other side not approachable or hidden, which panel can be thin in thickness, by the use of an auxiliary member, which auxiliary member has an elongate form so as to be insertable lengthwise through an insertion hole in the panel and which auxiliary member is positionable on the back side of the panel to extend along a linear distance on said back side of the panel, and by the use of a plurality of fasteners, each of which fasteners extends through aligned openings formed in the object, the panel and the auxiliary member and each of which openings is separate and spaced from the insertion hole to thereby provide a plurality of attachment forces, each of which forces is separate and spaced from the location of the insertion hole, and wherein the object has a rear surface directly engagable with a front surface of the panel and wherein the object itself can be large and/or heavy or the object can be a device such as a hinge which supports a large and/or heavy part such as a door, said fastening device comprising, an auxiliary member having an elongate form so as to be insertable lengthwise through an insertion hole in the panel, said auxiliary member having a surface complementary to and engagable with the back surface of the panel, said auxiliary member being sufficiently elongated in form to extend along a linear distance on said back side of the panel and being constructed to permit a plurality of fastening holes to be formed through the auxiliary member at locations spaced away from the insertion hole, fastening holes formed in the auxiliary member and the object and alignable with respective fastening holes formed in the panel, guide string means connected to the auxiliary member for pulling the auxiliary member forward after the auxiliary member has been inserted through the insertion hole to hold the front surface of the auxiliary member in place against the back surface of the panel member with the fastening holes of the auxiliary member in alignment with the fastening holes in the panel, fastener means insertable in the aligned fastening holes in the object, panel and auxiliary member for securely attaching the object to the panel when the fastener means are fastened to the auxiliary member, and wherein each of said fastening holes is separate and spaced from the insertion hole so that the fastener means provide a plurality of attachment forces each of which is separate and spaced from the location of the insertion hole, and whereby large and/or heavy objects can be securely attached to a panel which can be thin in thickness by a plurality of points of attachment which are separate and spaced from the insertion hole, and wherein the auxiliary member is provided with a pair of guide holes for the guide string means and positioned so that the guide string means can be pulled through the insertion hole and withdrawn after the object has been attached to the panel.

4. A fastening device for securely attaching objects, which objects can be large in size, to a front side of a panel having the other side not approachable or hidden, which panel can be thin in thickness, by the use of an auxiliary member, which auxiliary member has an elongate form so as to be insertable lengthwise through an insertion hole in the panel and which auxiliary member is positionable on the back side of the panel to extend along a linear distance on said back side of the panel, and by the use of a plurality of fasteners, each of which fasteners extends through aligned openings formed in the object, the panel and the auxiliary member and each of which openings is separate and spaced from the insertion hole to thereby provide a plurality of attachment forces, each of which forces is separate and spaced from the location of the insertion hole, and wherein the object has a rear surface directly engagable with a front surface of the panel and wherein the object itself can be large and/or heavy or the object can be a device such as a hinge which supports a large and/or heavy part such as a door, said fastening device comprising, an auxiliary member having an elongate form so as to be insertable lengthwise through an insertable hole in the panel, said auxiliary member having a surface complementary to and engagable with the back surface of the panel, said auxiliary member being sufficiently elongated in form to extend along a linear distance on said back side of the panel and being constructed to permit a plurality of fastening holes to be formed through the auxiliary member at locations spaced away from the insertion hole, fastening holes formed in the auxiliary member and the object and alignable with respective fastening holes formed in the panel, guide string means connected to the auxiliary member for pulling the auxiliary member forward after the auxiliary member has been inserted through the insertion hole to hold the front surface of the auxiliary member in place against the back surface of the panel member with the fastening holes of the auxiliary member in alignment with the fastening holes in the panel, fastener means insertable in the aligned fastening holes in the object, panel and auxiliary member for securely attaching the object to the panel when the fastener means are fastened to the auxiliary member, and wherein each of said fastening holes is separate and spaced from the insertion hole so that the fastener means provide a plurality of attachment forces each of which is separate and spaced from the location of the insertion hole, and whereby large and/or heavy objects can be securely attached to a panel which can be thin in thickness by a plurality of points of attachment which are separate and spaced from the insertion hole, and wherein the auxiliary member is divided along the direction of its length and includes bendable connecting means for connecting the divided pieces together so that the auxiliary member can be folded and unfolded and wherein the guide string means.

* * * * *